(12) United States Patent
Sawai

(10) Patent No.: US 9,161,234 B2
(45) Date of Patent: Oct. 13, 2015

(54) COMMUNICATION CONTROL APPARATUS, COMMUNICATION CONTROL METHOD, PROGRAM, AND COMMUNICATION SYSTEM

(75) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/981,377

(22) PCT Filed: Feb. 16, 2012

(86) PCT No.: PCT/JP2012/053640
§ 371 (c)(1),
(2), (4) Date: Jul. 24, 2013

(87) PCT Pub. No.: WO2012/114971
PCT Pub. Date: Aug. 30, 2012

(65) Prior Publication Data
US 2013/0310061 A1    Nov. 21, 2013

(30) Foreign Application Priority Data

Feb. 24, 2011    (JP) ................................. 2011-038160

(51) Int. Cl.
*H04W 16/14* (2009.01)
*H04W 72/00* (2009.01)
*H04W 72/02* (2009.01)

(52) U.S. Cl.
CPC .............. *H04W 16/14* (2013.01); *H04W 72/00* (2013.01); *H04W 72/02* (2013.01)

(58) Field of Classification Search
CPC .............. H04W 16/14; H04W 72/082; H04W 72/0453; H04W 72/04; H04W 72/1215; H04W 72/00

USPC ........... 455/422.1, 446, 454, 448, 450, 452.1, 455/451
See application file for complete search history.

(56) References Cited

U.S. PATENT DOCUMENTS

| 8,160,599 | B2 * | 4/2012 | Stanforth et al. ............. 455/450 |
| 8,451,789 | B2 * | 5/2013 | Junell et al. .................... 370/329 |
| 2009/0059856 | A1 * | 3/2009 | Kermoal et al. .............. 370/329 |
| 2011/0019104 | A1 * | 1/2011 | Kwak et al. .................... 348/731 |

(Continued)

FOREIGN PATENT DOCUMENTS

| JP | 2014-508468 | 4/2014 |
| WO | WO 2010/083606 A1 | 7/2010 |

OTHER PUBLICATIONS

International Search Report issued May 15, 2012 in Patent Application No. PCT/JP2012/053640.
Päivi Ruuska, et al., Neighbor Setting Procedures, IEEE 802.19-11/0002r1, Jan. 18, 2011, pp. 1-22.

(Continued)

*Primary Examiner* — Ajit Patel
(74) *Attorney, Agent, or Firm* — Oblon, McClelland, Maier & Neustadt, L.L.P.

(57) ABSTRACT

There is provided a communication control apparatus including an information acquisition unit that acquires information about channels, among frequency channels assigned to a primary system, available to a secondary system, a generation unit that generates a list of channels, among the channels available, recommended for a secondary usage node operating the secondary system, and a notification unit that notifies the secondary usage node of the list generated by the generation unit to allow the secondary usage node to select a channel for secondary usage.

14 Claims, 12 Drawing Sheets

(56) References Cited

U.S. PATENT DOCUMENTS

| | | | |
|---|---|---|---|
| 2012/0057533 A1* | 3/2012 | Junell et al. | 370/329 |
| 2012/0106461 A1* | 5/2012 | Kasslin et al. | 370/329 |
| 2012/0108179 A1* | 5/2012 | Kasslin et al. | 455/67.13 |
| 2012/0113906 A1* | 5/2012 | Kadous et al. | 370/329 |
| 2012/0182887 A1* | 7/2012 | Junell et al. | 370/252 |
| 2013/0157706 A1* | 6/2013 | Jo et al. | 455/512 |

OTHER PUBLICATIONS

J. Lee, et al., Coexistence Procedures and Protocols Clause, IEEE P802.19-11/0009r1. Jan. 17, 2011, pp. 1-40.

H. Kang, et al., Coexistence System Description, IEEE P802.19-11/0011r1, Jan. 17, 2011, pp. 1-17.

Office Action issued Dec. 9, 2014 in Japanese Patent Application No. 2011-38160 (with English translation).

* cited by examiner

COMMUNICATION CONTROL APPARATUS, COMMUNICATION CONTROL METHOD, PROGRAM, AND COMMUNICATION SYSTEM

TECHNICAL FIELD

The present disclosure relates to a communication control apparatus, a communication control method, a program, and a communication system.

BACKGROUND ART

As one of measures to mitigate exhaustion of frequency resources in the future, the discussion about secondary usage of a frequency is under way. The secondary usage of a frequency is to use a part or all of a frequency channel preferentially assigned to some system secondarily by another system. In general, the system to which a frequency channel is preferentially assigned is called a primary system and the system that secondarily uses the frequency channel is called a secondary system.

A TV white space is an example of the frequency channel discussed for secondary usage. The TV white space refers to, among frequency channels assigned to a TV broadcasting system as a primary system, a channel that is not used by the TV broadcasting system depending on the region. By releasing the TV white space for secondary usage, efficient utilization of frequency resources can be realized. As specifications of the wireless access method of the physical layer (PHY) and the MAC layer to enable secondary usage of the TV white space, for example, a plurality of standard specifications like IEEE802.22, IEEE802.11af, and ECMA (European Computer Manufacturer Association)-392 (CogNea) is known.

The IEEE802.19 is currently working to allow smooth coexistence of a plurality of secondary systems using different wireless access methods. For example, Non-Patent Literature 1 below divides various functions needed for coexistence of secondary systems into three functional entities of CM (Coexistence Manager), CE (Coexistence Enabler), and CDIS (Coexistence Discovery and Information Server). CM is a functional entity that mainly makes a decision for coexistence. CE is a functional entity to be an interface that mediates instruction transmission or information exchange between CM and a secondary usage node. CDIS is a functional entity to be a server that manages information of a plurality of secondary systems.

CITATION LIST

Non-Patent Literature

Non-Patent Literature 1: "Coexistence System Description", [online], [Searched on Feb. 14, 2011],the Internet <URL:https://mentor.ieee.org/802.19/dcn/11/19-11-0011-01-0001-coexistence-system-description.pdf>

SUMMARY OF INVENTION

Technical Problem

However, how to arrange each of the above functional entities in which apparatus constituting a system is not yet discussed. For example, depending on the position of CM, the load of signaling between CM and a secondary usage node via CE may degrade network performance. In addition, when, for example, CM is arranged on a secondary usage node, circumstances in which it is not suitable to select one CM as the master CM can also be considered. Thus, if the arrangement of functional entities is different, system models that can efficiently control coexistence of secondary systems are also different.

Therefore, technology according to the present disclosure is to provide a communication control apparatus, a communication control method, a program, and a communication system that provide a control model capable of efficiently controlling coexistence of secondary systems.

Solution to Problem

According to an embodiment of the present disclosure, there is provided a communication control apparatus including an information acquisition unit that acquires information about channels, among frequency channels assigned to a primary system, available to a secondary system, a generation unit that generates a list of channels, among the channels available, recommended for a secondary usage node operating the secondary system, and a notification unit that notifies the secondary usage node of the list generated by the generation unit to allow the secondary usage node to select a channel for secondary usage.

Further, the information acquisition unit may acquire the information about the channels available from a server storing information about one or more secondary systems. The notification unit may notify the server of the channel selected by the secondary usage node.

Further, the notification unit may further notify another communication control apparatus of the channel selected by the secondary usage node.

Further, the generation unit may generate the list in accordance with a request from the secondary usage node.

Further, the generation unit may decide the channels recommended to the secondary usage node in a way that interference with the primary system caused by the secondary system does not exceed a permissible level.

Further, the generation unit may decide the channels recommended to each of the secondary usage nodes in a way that interference between the secondary systems operated by each of the secondary usage nodes does not exceed a permissible level.

Further, when a central channel selection by a master control apparatus or an autonomous channel selection by the secondary usage node is not adopted, the communication control apparatus may generate the list and notifies the secondary usage node of the list.

Further, according to another embodiment of the present disclosure, there is provided a communication control method to control secondary usage of frequency channels including acquiring information about channels, among frequency channels assigned to a primary system, available to a secondary system, generating a list of channels, among the channels available, recommended for a secondary usage node operating the secondary system, and notifying the secondary usage node of the list generated to allow the secondary usage node to select a channel for secondary usage.

Further, according to another embodiment of the present disclosure, there is provided a program causing a computer that controls a communication control apparatus controlling secondary usage of frequency channels, to function as an information acquisition unit that acquires information about channels, among frequency channels assigned to a primary system, available to a secondary system, a generation unit that generates a list of channels, among the channels available, recommended for a secondary usage node operating the secondary system, and a notification unit that notifies the secondary usage node of the list generated by the generation unit to allow the secondary usage node to select a channel for the secondary usage.

Further, according to another embodiment of the present disclosure, there is provided a communication system including a communication control apparatus including an information acquisition unit that acquires information about channels, among frequency channels assigned to a primary system, available to a secondary system, a generation unit that generates a list of channels, among the channels available, recommended for a secondary usage node operating the secondary system, and a notification unit that notifies the secondary usage node of the list generated by the generation unit, and a secondary usage node that selects a channel for the secondary usage based on the list notified from the communication control apparatus.

Advantageous Effects of Invention

According to a communication control apparatus, a communication control method, a program, and a communication system according to the present disclosure, a control model capable of efficiently controlling coexistence of secondary systems is provided.

DESCRIPTION OF EMBODIMENT

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

"Description of Embodiment" will be described in the following order:

1. System Overview
1-1. Overall System Configuration
1-2. Description of Functional Entities
1-3. Example of Information Used for Decision-Making
1-4. Arrangement Example of Functional Entities
2. First Control Model
2-1. Apparatus Configuration
2-2. Processing Flow
3. Second Control Model
3-1. Apparatus Configuration
3-2. Processing Flow
4. Third Control Model
4-1. Apparatus Configuration
4-2. Processing Flow
5. Composite Control Model
6. Summary <1. System Overview>

[1-1. Overall System Configuration]

Figure 1:
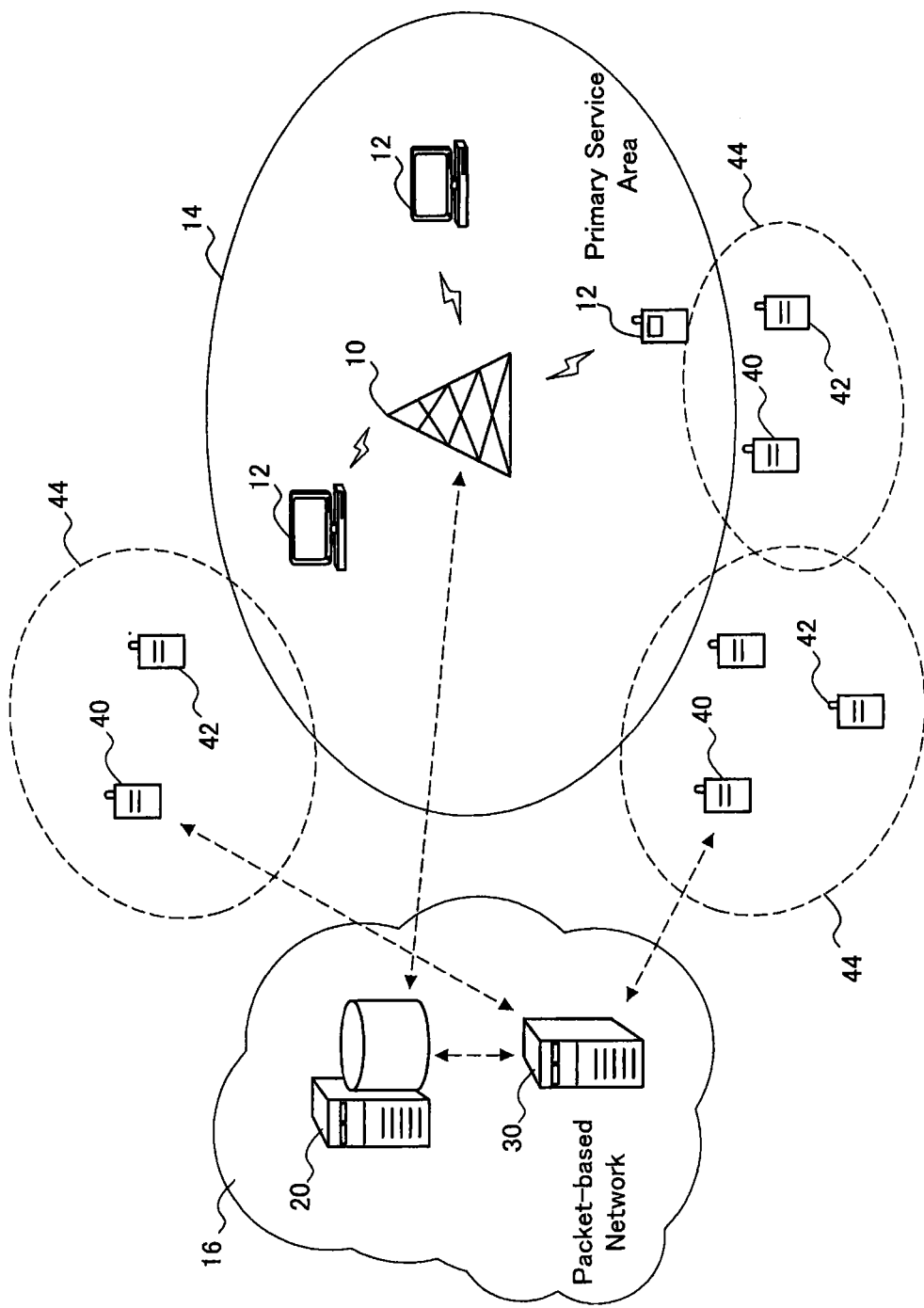
FIG. 1 is an explanatory view illustrating an overview of a communication system according to an embodiment.

FIG. 1 is an explanatory view illustrating an overview of a communication system according to an embodiment.

Referring to FIG. 1, a primary transmitting station 10 constituting a primary system and a plurality of primary receiving stations 12 are shown. The primary transmitting station 10 provides a primary system service to the primary receiving stations 12 positioned inside a service area 14. The primary transmitting station 10 may be, for example, a broadcasting station of TV broadcasting or a wireless base station or a relay station of a cellular communication method. When the primary transmitting station 10 is a broadcasting station of TV broadcasting, the primary receiving station 12 is a receiver having a receiving antenna for TV broadcasting and a tuner. When the primary transmitting station 10 is a wireless base station of a cellular communication method, the primary receiving station 12 is a wireless terminal operating according to the cellular communication method. In the description that follows, the primary transmitting station 10 and the primary receiving station 12 may generically be called primary usage nodes.

The primary transmitting station 10 is connected to a data server 20 positioned in a packet-based network 16. The packet-based network 16 may be the Internet or a backbone network of a primary system. The data server 20 is a server apparatus having a database storing data on secondary usage of secondary channels. A communication control apparatus 30 is further connected to the data server 20. The communication control apparatus 30 is an apparatus introduced to control coexistence among a plurality of secondary systems using frequency channels assigned to a primary system.

In FIG. 1, a plurality of secondary usage nodes 40, 42 is further shown. The secondary usage node 40 is an apparatus that provides a secondary system service (hereinafter, called a secondary communication service) to the secondary usage node 42 positioned inside a service area 44 by using a frequency channel assigned to a primary system. When the primary system is a TV broadcasting system, the secondary usage node 40 is also called a master TVBD (TV Band Device). The secondary usage node 40 is typically has a geo-location function and a function to access the communication control apparatus 30. The secondary usage node 40 may directly be accessible to the data server 20. The secondary usage node 42 is an apparatus positioned inside each of the service areas 44 to use the secondary communication service provided by the secondary usage node 40. When the primary system is a TV broadcasting system, the secondary usage node 42 is also called a slave TVBD. In principle, the secondary usage node 42 transmits a radio signal after obtaining permission from the nearby secondary usage node 40.

Figure 2:
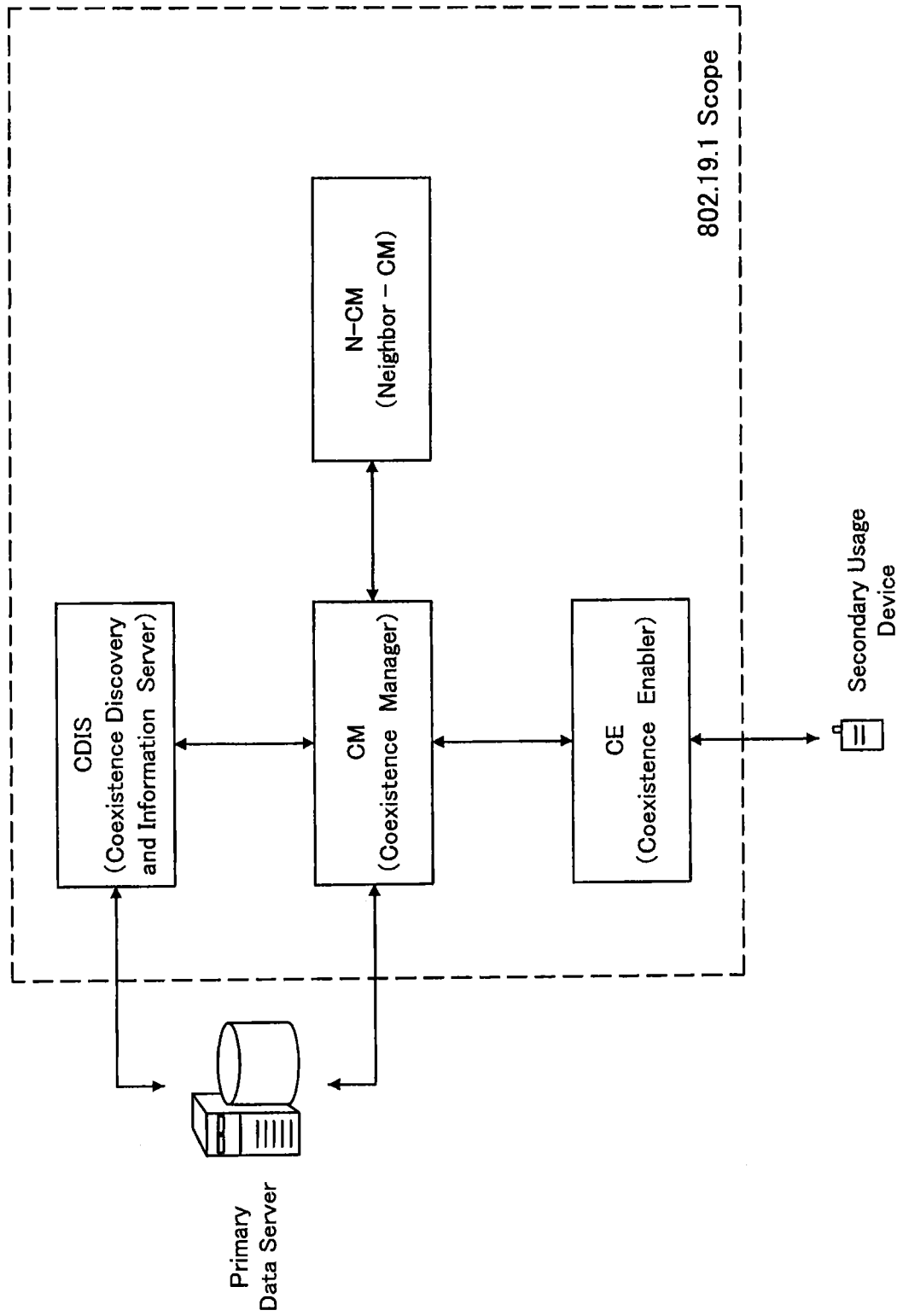
FIG. 2 is an explanatory view showing correlations among three functional entities to support coexistence.

The secondary usage node 40 registers information about a secondary system with the data server 20 before starting the operation of the secondary system. Then, the secondary usage node 40 operates the secondary system based on control information provided from the data server 20. However, when a plurality of secondary systems is operated in parallel like the situation shown in FIG. 1, the risk of fatally affecting the primary system may be incurred due to collisions of signals between secondary systems or overlapping interference caused by signals transmitted from each secondary system. Particularly, when the wireless access methods used by secondary systems are different, it is difficult to operate the system while maintaining cooperation among secondary systems, further raising the above risk. Thus, the IEEE802.19 is working on a mechanism to smoothly support coexistence of a plurality of secondary systems (see Non-Patent Literature 1 described above). In IEEE802.19, various functions to support coexistence of secondary systems are divided into three groups of functional entities of CM, CE, and CDIS (see FIG. 2).

[1-2. Description of Functional Entities]

(1) CM (Coexistence Manager)

CM is a functional entity that makes a decision for coexistence. CM acquires information about a primary system, information about available channels, and information about secondary systems. Sources from which information is acquired by CM include CDIS, other CM, and secondary usage nodes (accessed via CE). Based on the above information, CM decides which frequency channel to be used by a secondary usage node under the control thereof to operate the secondary system. CM may further decide additional control parameters such as the maximum transmission power, recommended wireless access method, and period of updating position data for each secondary usage node. Then, according to decided parameters, CM allows each secondary usage node to operate a secondary system or to reconfigure a secondary system.

(2) CE (Coexistence Enabler)

CE is a functional entity to be an interface that mediates instruction transmission or information exchange between CM and a secondary usage node. For example, CE converts information held by a secondary usage node into a format that can be used by CM and transmits the converted information to the CM. CE also converts an instruction about coexistence of secondary systems from CM into a format that can be executed by a secondary usage node and transmits the converted information to the secondary usage node.

(3) CDIS (Coexistence Discovery and Information Server)

CDIS is a functional entity to be a server that manages information of a plurality of secondary systems. For example, CDIS collects information about secondary systems from each secondary usage node via CE and CM. CDIS also collects information about the primary system and information about available channels from the data server 20. Then, CDIS stores collected information in a database. The information stored by CDIS is used when a decision about coexistence is made by CM. CDIS also supports neighbor discovery of neighbor-CM positioned near some CM. Further, CDIS may also select a master CM described later.

In the embodiments described below, at least one of the above three functional entities is implemented in the communication control apparatus 30 shown in FIG. 1. Only the one communication control apparatus 30 is shown in the example of FIG. 1, but a plurality of the communication control apparatuses 30, each of which having at least one of the functional entities, may be provided in the packet-based network 16. A part of the functional entities may be implemented on the individual secondary usage nodes 40. In addition, a part of the functional entities may also be implemented in the same apparatus as the database 20.

[1-3. Example of Information Used for Decision-Making]

A decision for coexistence of secondary systems is made based mainly on information about the primary system, information about available channels, and information about secondary systems. The information about the primary system includes, for example, at least one of the following information:

Primary usage node position, antenna height, and transmission power

Primary system service area and guard area position

Primary system permissible interference amount

Information about available channels includes, for example, at least one of the following information:

Channel number list

Maximum permissible transmission power for each channel

Spectrum mask

Channel classification

Parameters for interference calculation

The channel classification may be, for example, a classification of a restricted channel on which restrictions to allow lower transmission power than general transmission power are imposed and a normal channel on which no such restrictions are imposed. As an example, when the so-called Mode-I in the US FCC (Federal Communications Commission) regulations is Personal/Portable, the maximum transmission power of 100 m[W] is permitted if neighboring channels of some channel are not used by the primary system. Such a channel is handled as a normal channel. On the other hand, if a neighboring channel of some channel is used by the primary system, the maximum transmission power is restricted to 40 m[W]. Such a channel is handled as a restricted channel. Parameters for interference calculation may include, for example, the adjacent channel leakage ratio (ACLR), fading margin, shadowing margin, protection ratio, and ACS (Adjacent Channel Selection).

The information about secondary systems includes, for example, at least one of the following information:

Number of active nodes belonging to secondary systems

Wireless access method used by secondary systems

Required quality of secondary systems

Regulation ID and manufacturer ID of secondary usage nodes

Secondary usage node position, antenna height, and transmission power

Administrator information

The wireless access method may be represented in a number (or a list thereof) format identifying an individual wireless access method like, for example, IEEE802.11af, 11g, or 11n, IEEE802.22, IEEE802.16, and ECMA-392. The regulation ID is an ID attached to each device when authenticated as a device that can be used for secondary usage.

[1-4. Arrangement Example of Functional Entities]

The above three functional entities may be arranged in each apparatus as shown, for example, in FIGS. 3 to 6. The arrangements of the functional entities described here is only by way of example and other arrangements may also be used.

(1) First Example

Figure 3:
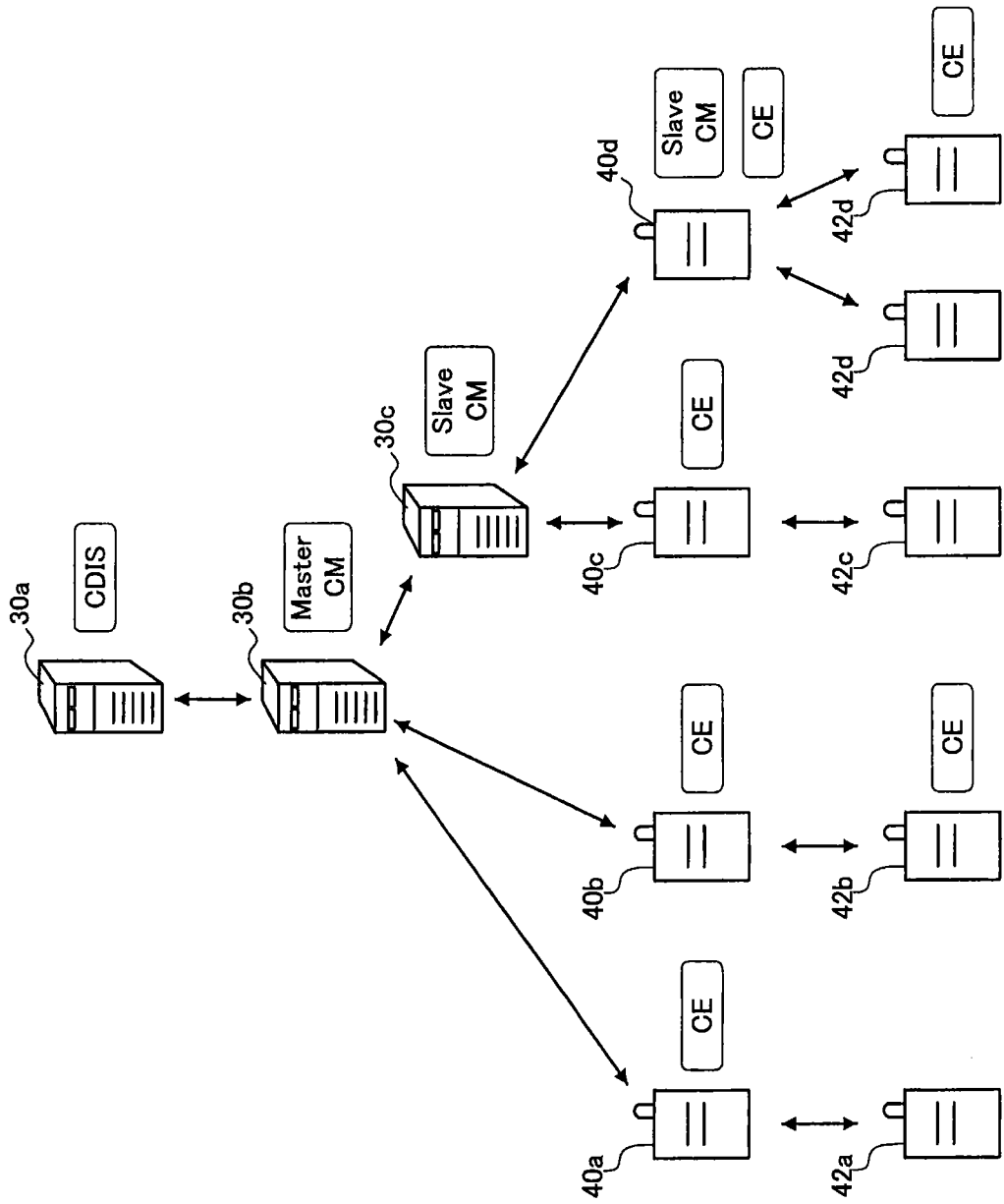
FIG. 3 is an explanatory view showing a first example of arrangement of the functional entities.

In the example of FIG. 3, CDIS is arranged in a communication control apparatus 30a and CM is arranged in each of communication control apparatuses 30b, 30c. Further, CM is arranged also on a secondary usage node 40d. Among these CMs, the CM in the communication control apparatus 30b is specified as the master CM. Other CMs become slave CMs. Secondary usage nodes 40a, 40b belong to the communication control apparatus 30b. A secondary usage node 40c and the secondary usage node 40d belong to the communication control apparatus 30c. CE is arranged on each of the secondary usage nodes 40a, 40b, 40c, 40d. Thus, each of the secondary usage nodes 40 as master devices (which are different from the master CM and may be, for example, master TVBD) operating each secondary system has at least CE to interact with CM.

(2) Second Example

Figure 4:
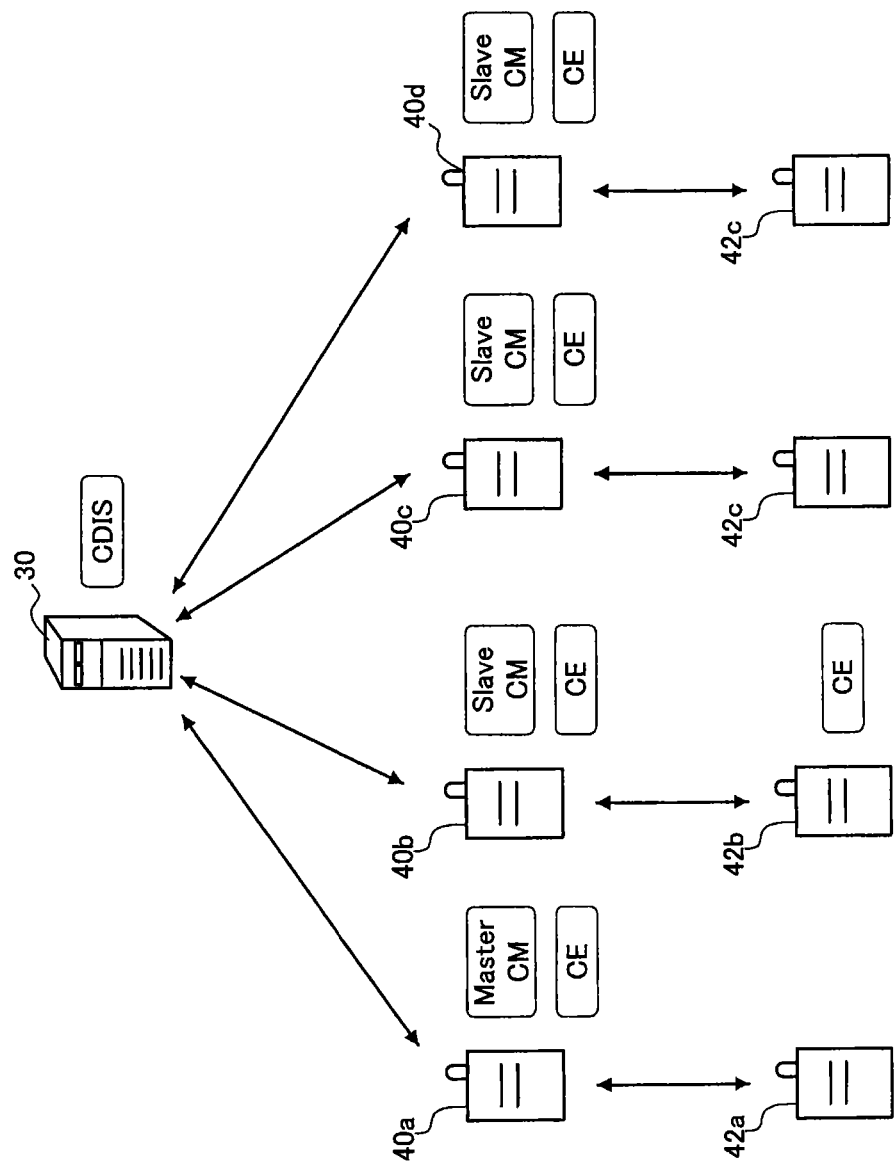
FIG. 4 is an explanatory view showing a second example of arrangement of the functional entities.

In the example of FIG. 4, CDIS is arranged in the communication control apparatus 30. On the other hand, CM is arranged on each of the secondary usage nodes 40a, 40b, 40c, 40d. Among these CMs, the CM on the secondary usage node 40a is specified as the master CM. Other CMs become slave CMs. Further, CE is arranged on each of the secondary usage nodes 40a, 40b, 40c, 40d. Thus, CM may be arranged on a secondary usage node or in a packet-based network.

(3) Third Example

Figure 5:
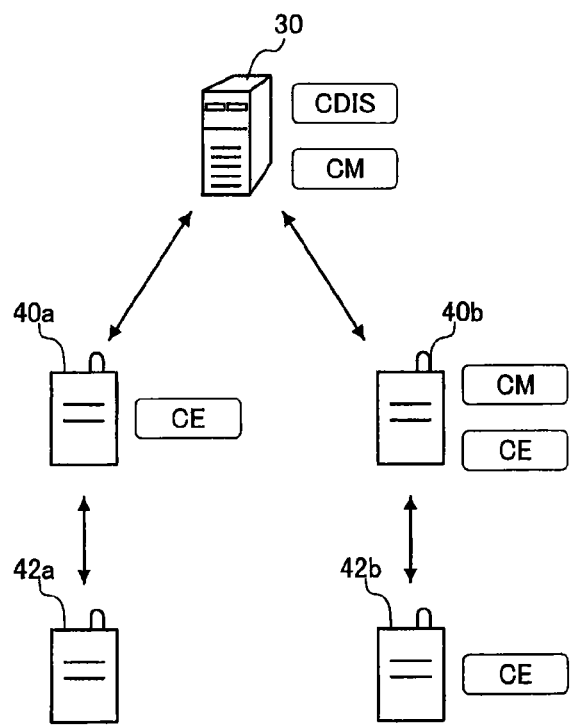
FIG. 5 is an explanatory view showing a third example of arrangement of the functional entities.

In the example of FIG. 5, CDIS and CM are arranged in the communication control apparatus 30. Thus, CDIS and CM may be arranged in one apparatus. Further, CM is arranged on the secondary usage node 40b belonging to the communication control apparatus 30. Each CM is neither the master CM nor slave CM. CE is arranged on each of the secondary usage nodes 40a, 40b.

(4) Fourth Example

Figure 6:
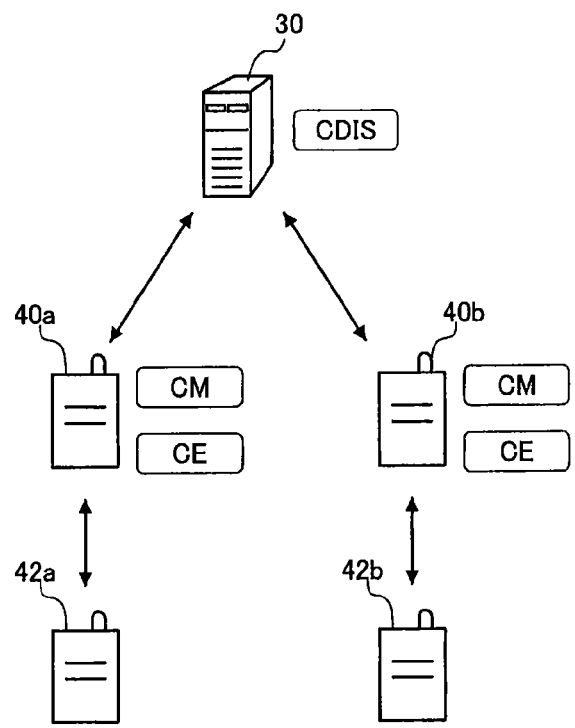
FIG. 6 is an explanatory view showing a fourth example of arrangement of the functional entities.

In the example of FIG. 6, CDIS is arranged in the communication control apparatus 30. Further, CM is arranged on each of the secondary usage nodes 40a, 40b belonging to the communication control apparatus 30. Also in the example of FIG. 6, each CM is neither the master CM nor slave CM. CE is arranged on each of the secondary usage nodes 40a, 40b.

Therefore, the functional entities for coexistence of secondary systems are arranged in various forms in a system and if the arrangement of the functional entities is different, system models that can efficiently control coexistence of secondary systems are also different. Therefore, three control models to efficiently control coexistence of secondary systems will be described below.

<2. First Control Model>

The first control model is a control model in which one master CM makes decisions concentratedly. Slave CMs follow decisions made by the master CM. The first control model is suitable for the arrangement of functional entities as illustrated in, for example, FIG. 3.

[2-1. Apparatus Configuration]

Figure 7:
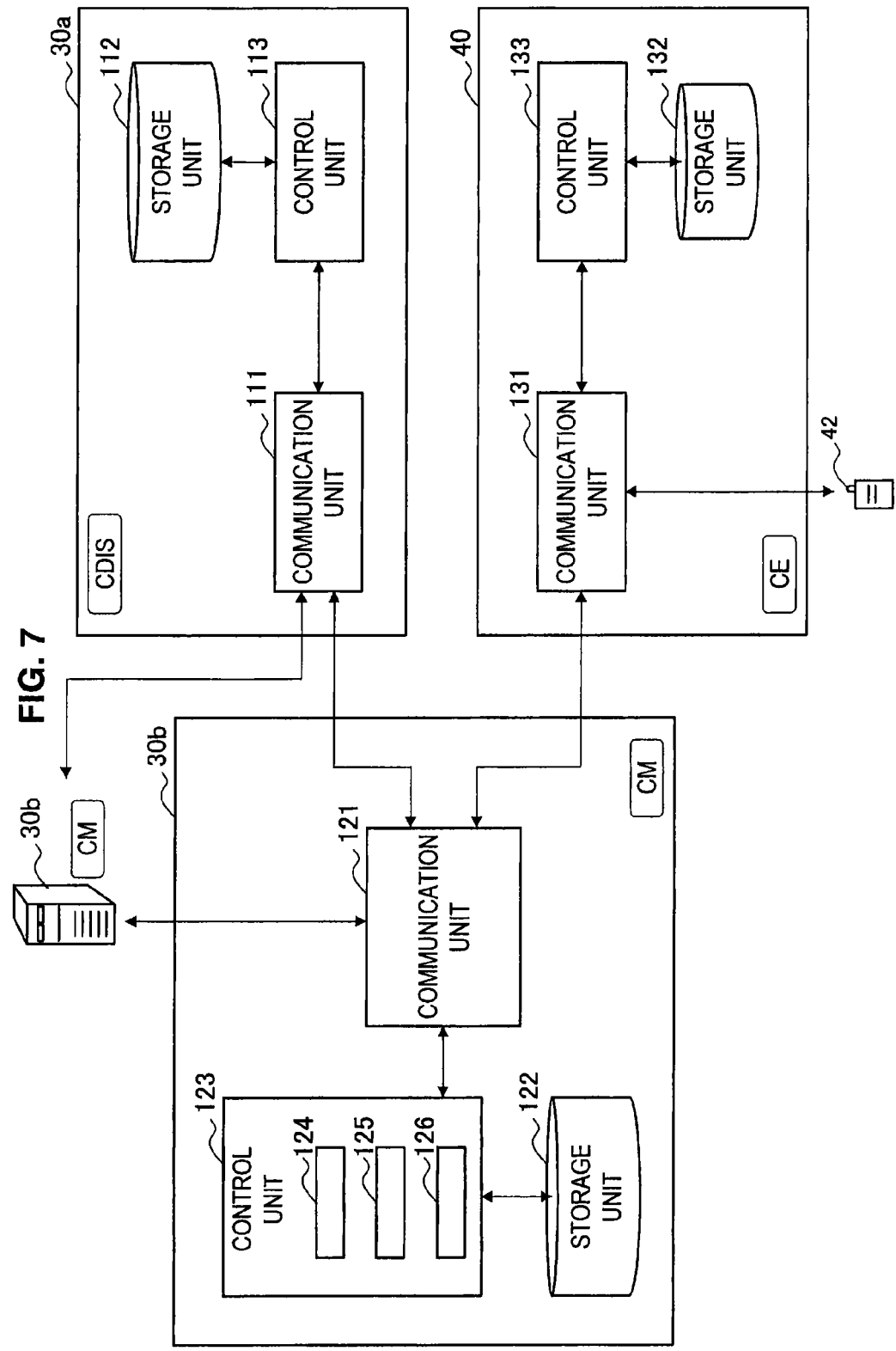
FIG. 7 is a block diagram showing an example of the configuration of apparatuses in a first control model.

FIG. 7 is a block diagram showing an example of the configuration of apparatuses in the first control model. Referring to FIG. 7, the communication control apparatus 30a having CDIS, the communication control apparatus 30b having CM, and the secondary usage node 40 having CE are shown.

(1) CDIS

The communication control apparatus 30a includes a communication unit 111, a storage unit 112, and a control unit 113.

The communication unit 111 is a communication interface for the communication control apparatus 30a to communicate with other apparatuses. Though not shown in FIG. 7, the communication unit 111 is also connected to the data server 20 shown in FIG. 1. Communication by the communication unit 111 may be wireless communication or wire communication.

The storage unit 112 stores information about the primary system collected by the communication control apparatus 30a using a hard disk or a storage medium such as a semiconductor memory, information about available channels, and information about secondary systems.

The control unit 113 controls the function of the communication control apparatus 30a as CDIS using a processor such as a CPU (Central Processing Unit). For example, the control unit 113 collects information about secondary systems from each of the secondary usage nodes 40 via CE and CM. The control unit 113 also collects information about the primary system and information about available channels from the data server 20. The control unit 113 also supports neighbor discovery of neighbor-CM positioned near some CM.

In the first control model, the control unit 113 selects one master CM from a plurality of CMs. For example, the control unit 113 may select the master CM according to at least one of the following selection criteria:

CM having capabilities as the master CM

Arranged closer to CDIS in a hierarchical structure of nodes

Communicable with CDIS at a higher rate

Then, the control unit 113 notifies each CM of the selection result after the master CM being selected.

(2) CM

The communication control apparatus 30b includes a communication unit 121, a storage unit 122, and a control unit 123.

The communication unit 121 is a communication interface for the communication control apparatus 30b to communicate with other apparatuses. Though not shown in FIG. 7, the communication unit 121 is also connected to the data server 20 shown in FIG. 1. Communication by the communication unit 121 may be wireless communication or wire communication.

The storage unit 122 stores information acquired by the communication control unit 30b using a hard disk or a storage medium such as a semiconductor memory.

The control unit 123 controls the function of the communication control apparatus 30b as CM using a processor such as a CPU. More specifically, in the first control model, the control unit 123 includes an information acquisition unit 124, a decision unit 125, and a notification unit 126.

If CM of the local apparatus is specified as the master CM, the information acquisition unit 124 acquires information about the primary system and information about channels, among frequency channels assigned to the primary system, available for secondary systems from the communication control apparatus 30a having CDIS via the communication unit 121. In addition, the information acquisition unit 124 acquires information about secondary systems from the secondary usage nodes 40 via the communication unit 121. The decision unit 125 decides the channel, among available channels, to be used by each of the secondary usage nodes 40 operating secondary systems. Decision targets here typically include the master CM and all the active secondary usage nodes 40 belonging to slave CMs. Then, the notification unit 126 notifies each of the secondary usage nodes 40 of the channel decided by the decision unit 125.

The decision unit 125 may decide channels to be used by each of the secondary usage nodes 40 in such a way that the total of interference with the primary system caused by secondary systems does not exceed the permissible amount of interference of the primary system based on, for example, information acquired by the information acquisition unit 124. Alternatively, the decision unit 125 may decide channels to be used by each of the secondary usage nodes 40 in such a way that, for example, mutual interference between secondary systems does not exceed a permissible level. The interference level between systems can be calculated based on the node position, antenna height, transmission power, and above parameters for interference calculation. In addition, the permissible interference level can be preset for each system or calculated based on required quality of each system. If the normal channel and the restricted channel can be assigned, the decision unit 125 may assign the normal channel preferentially to each of the secondary usage nodes 40. If the wireless access method that can be used by a plurality of secondary systems supports the mesh protocol, the decision unit 125 may form a mesh network by assigning a channel common to the plurality of secondary systems. However, criteria for assigning a channel are not limited to the examples described here and other criteria may also be used.

If another CM is specified as the master CM, the information acquisition unit 124 acquires a notification of channel assignment decided by the master CM via the communication unit 121. Then, the decision unit 125 recognizes the channel to be used by the secondary usage nodes 40 belonging to CM of the local apparatus as slave CM based on the notification acquired by the information acquisition unit 124. Then, the notification unit 126 notifies each of the secondary usage nodes 40 of the recognized channel.

(3) CE

The secondary usage node 40 includes a communication unit 131, a storage unit 132, and a control unit 133.

The communication unit 131 contains a communication interface for the secondary usage node 40 to communicate with an apparatus in the packet-based network 16 and a communication interface for the secondary usage node 40 to operate a secondary system. Communication with the packet-based network 16 by the communication unit 131 may be wireless communication or wire communication.

The storage unit 132 stores information acquired by the secondary usage node 40 using a hard disk or a storage medium such as a semiconductor memory.

The control unit 133 controls the function of the secondary usage node 40 as CE and also controls the operation of a secondary system by the secondary usage node 40 using a processor such as a CPU. For example, when the channel to be used for the operation of a secondary system is notified from CM, the control unit 133 interprets the notification from CM to recognize the notified channel. Then, the control unit 133 starts the operation of a secondary system or reconfigures a secondary system on the recognized channel.

[2-2. Processing Flow]

Figure 8:
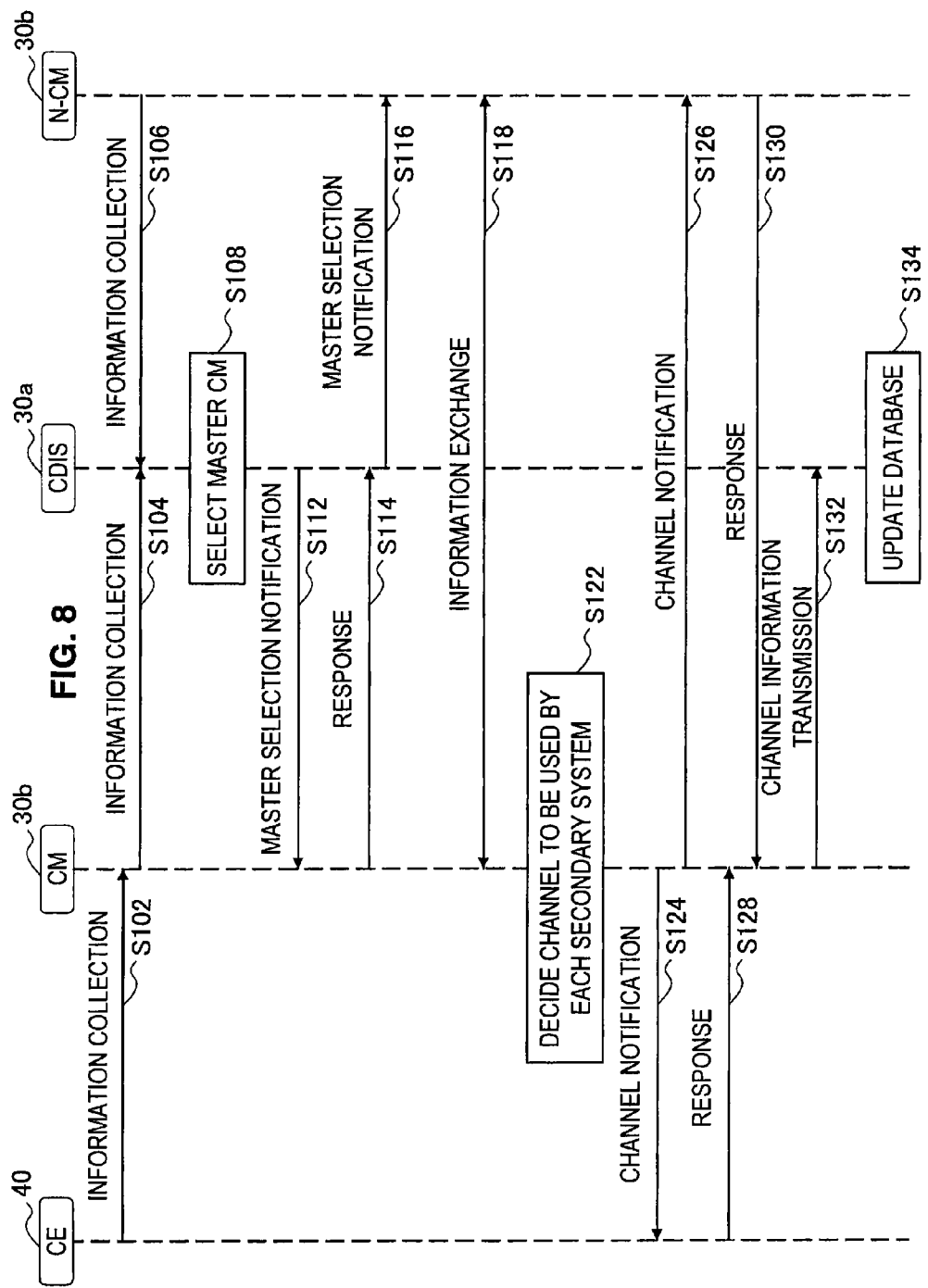
FIG. 8 is a sequence diagram showing an example of the flow of communication control processing in the first control model.

FIG. 8 is a sequence diagram showing an example of the flow of communication control processing in the first control model. Referring to FIG. 8, CM first collects information about secondary systems from CE of the secondary usage nodes 40 belonging to the local apparatus (step S102). CDIS collects information about secondary systems from each CM (steps S104, S106). CDIS also acquires information about the primary system and information about available channels from the data server 20.

Next, CDIS selects one master CM from a plurality of CM based on the acquired information (step S108). Next, CDIS transmits a master selection notification for notification of the selection result of the master CM to each CM (steps S112, S116). The CM selected as the master CM transmits a response indicating acceptance of the selection to CDIS (step S114).

Subsequently, the master CM exchanges information used for selection of the channel with CDIS and slave CM (step S118). Next, the master CM decides the channel to be used by each of the secondary usage nodes 40 operating secondary systems (step S122). Then, the master CM transmits a channel notification for notification of the channel decided for each of the secondary usage nodes 40 to each of the secondary usage nodes 40 (step S124). The channel notification is made also to the secondary usage nodes 40 belonging to slave CM via the slave CM (step S126). Then, a response is transmitted from each of the secondary usage nodes 40 to the master CM (steps S128, S130).

Subsequently, the master CM transmits information about the channel to be used by each of the secondary usage nodes 40 to CDIS (step S132). Then, CDIS updates a database based on information transmitted from the master CM (step S134).

Incidentally, in a response to CDIS from CM in step S114, CM may indicate a rejection of the selection as the master CM. In such a case, CDIS re-selects another CM as a candidate of the master CM.

Though not shown in FIG. 8, after the notification of the master selection from CDIS to slave CM in step S116, a response may be transmitted from the slave CM to CDIS. When responses from all slave CMs are received (or a predetermined period passes without a response), CDIS can transmit a trigger for control start to the master CM. Incidentally, the slave CM that does not respond to the notification of the master selection within a predetermined period or the CM that rejects the selection as the master CM may be excluded from the control by the master CM. When a trigger for control start is received from CDIS, the master CM can notify CDIS, other CMs, and the secondary usage nodes 40 that communication control processing in step S118 and thereafter will be started. The information exchange in step S118 may be made not only between the master CM and slave CM, but also between the master CM and CM excluded from the control.

<3. Second Control Model>

In the first control model, one master CM collectively decides channels used not only by secondary usage nodes belonging to the master CM, but also by secondary usage nodes belonging to slave CM. In this case, there is no possibility of mutual competition of decisions by a plurality of CMs so that the function of CM can advantageously be realized relatively easily. However, according to the first control model, a large amount of information needed to decide channel assignment is collected in the master CM. Thus, there is a possibility that the load of signaling between the master CM and other nodes degrades network performance. In addition, when CM is arranged on a secondary usage node, circumstances in which it is difficult to select one CM as the master CM in terms of performance can also be considered. Therefore, like the second control model described in this section, it is useful to transfer a part of authority of CM to secondary usage nodes.

[3-1. Apparatus Configuration]

Figure 9:
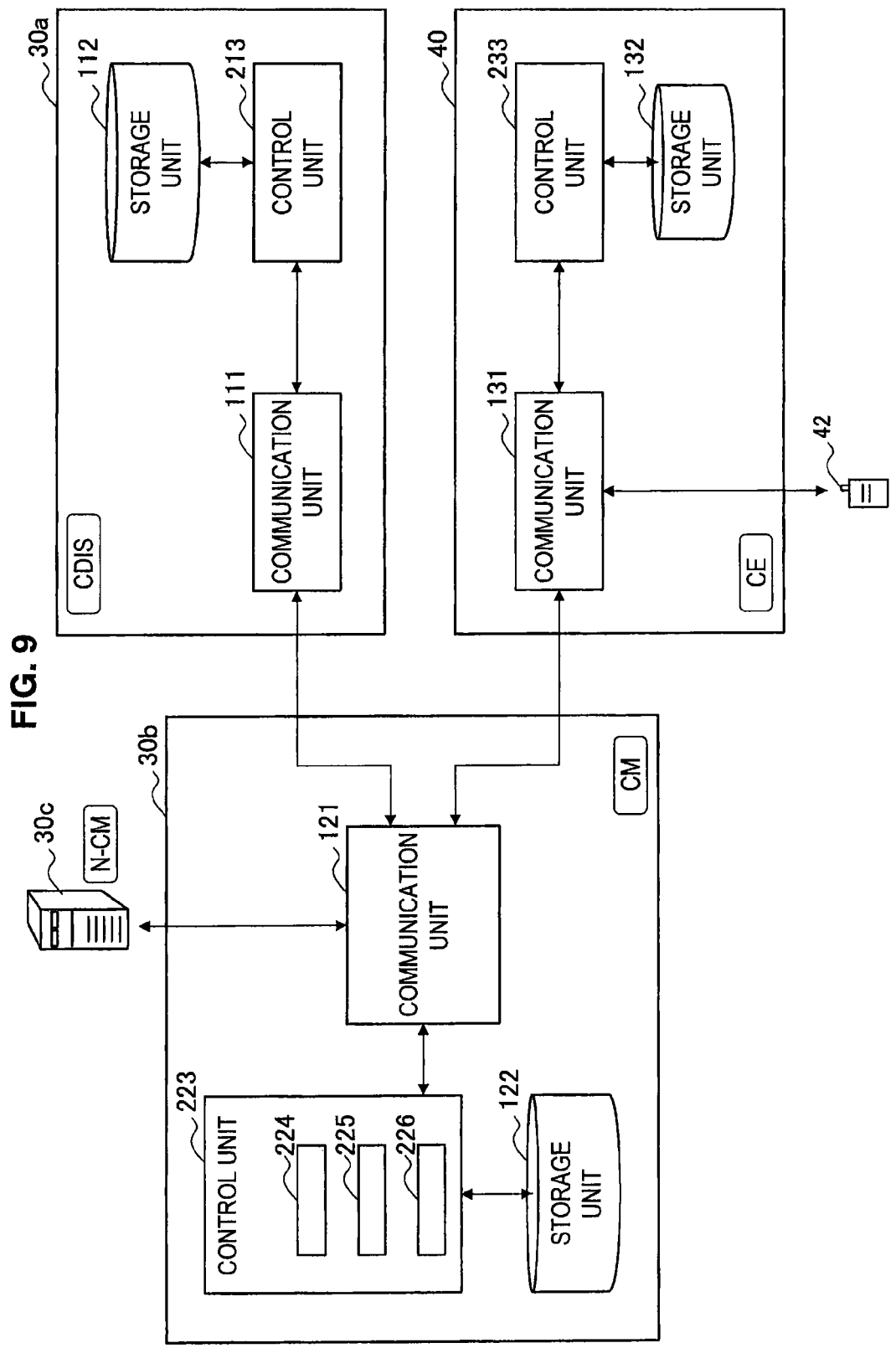
FIG. 9 is a block diagram showing an example of the configuration of apparatuses in a second control model.

FIG. 9 is a block diagram showing an example of the configuration of apparatuses in the second control model. Referring to FIG. 9, the communication control apparatus 30*a* having CDIS, the communication control apparatus 30*b* having CM, and the secondary usage node 40 having CE are shown.

(1) CDIS

The communication control apparatus 30*a* includes the communication unit 111, the storage unit 112, and a control unit 213.

The control unit 213 controls the function of the communication control apparatus 30*a* as CDIS using a processor such as a CPU. For example, the control unit 213 collects information about secondary systems from each of the secondary usage nodes 40 via CE and CM. The control unit 213 also collects information about the primary system and information about available channels from the data server 20. The control unit 213 also supports neighbor discovery of neighbor-CM positioned near some CM. In the second control model, the control unit 213 does not select the master CM. Instead, a plurality of CMs operates in parallel while cooperating with each other.

(2) CM

The communication control apparatus 30b includes the communication unit 121, the storage unit 122, and a control unit 223.

The control unit 223 controls the function of the communication control apparatus 30b as CM using a processor such as a CPU. More specifically, in the second control model, the control unit 223 includes an information acquisition unit 224, a generation unit 225, and a notification unit 226.

The information acquisition unit 224 acquires information about the primary system and information about channels, among frequency channels assigned to the primary system, available for secondary systems from the communication control apparatus 30a having CDIS. In addition, the information acquisition unit 224 acquires information about secondary systems from the secondary usage nodes 40 belonging to CM of the local apparatus.

The generation unit 225 generates a list of channels, among available channels, recommended for each of the secondary usage nodes 40 based on information acquired by the information acquisition unit 224. The generation unit 225 may generate a list of recommended channels, for example, in response to a request from the secondary usage node 40. Alternatively, a list of recommended channels may be generated when interference exceeding a permissible level occurs or an event such as a signal collision is detected.

The generation unit 225 may decide channels that are not used by the secondary usage node 40 belonging to the neighbor-CM as recommended channels. The generation unit 225 may also decide recommended channels in such a way that the total of interference with the primary system caused by secondary systems does not exceed the permissible amount of interference of the primary system. Alternatively, the generation unit 225 may decide recommended channels in such a way that, for example, mutual interference between secondary systems does not exceed a permissible level. When compared with a case of the first control model, the permissible interference level in the second control model may be a level that can easily be set by allowing for a margin. If the normal channel and the restricted channel can be assigned, the generation unit 225 may recommend the normal channel preferentially to each of the secondary usage nodes 40. However, criteria for deciding recommended channels are not limited to the examples described here and other criteria may also be used.

The notification unit 226 notifies each of the secondary usage nodes 40 belonging to CM of the local apparatus of a list of recommended channels generated by the generation unit 225 to allow each of the secondary usage nodes 40 to select the channel for secondary usage. The notification unit 226 also notifies CDIS and neighbor-CM of information about the channel selected by each of the secondary usage nodes 40.

(3) CE

The secondary usage node 40 includes the communication unit 131, the storage unit 132, and a control unit 233.

The control unit 233 controls the function of the secondary usage node 40 as CE and also controls the operation of a secondary system by the secondary usage node 40 using a processor such as a CPU. When a list of recommended channels is notified from CM, for example, the control unit 233 selects the channel to be used for operation of a secondary system from channels contained in the notified list. The control unit 233 may select the channel in consideration of a result of sensing by the secondary usage node 40 or 42. For example, the control unit 233 may select the channel according to at least one of the following selection criteria:

The channel can satisfy required quality of a secondary system

The channel is judged to have less interference with the primary system or other secondary systems However, criteria for selecting a channel are not limited to the examples described here and other criteria may also be used. When one or a plurality of channels is selected, the control unit 233 notifies CM of the selection result. In addition, the control unit 233 starts the operation of a secondary system or reconfigures a secondary system on the selected channel.

[3-2. Processing Flow]

Figure 10:
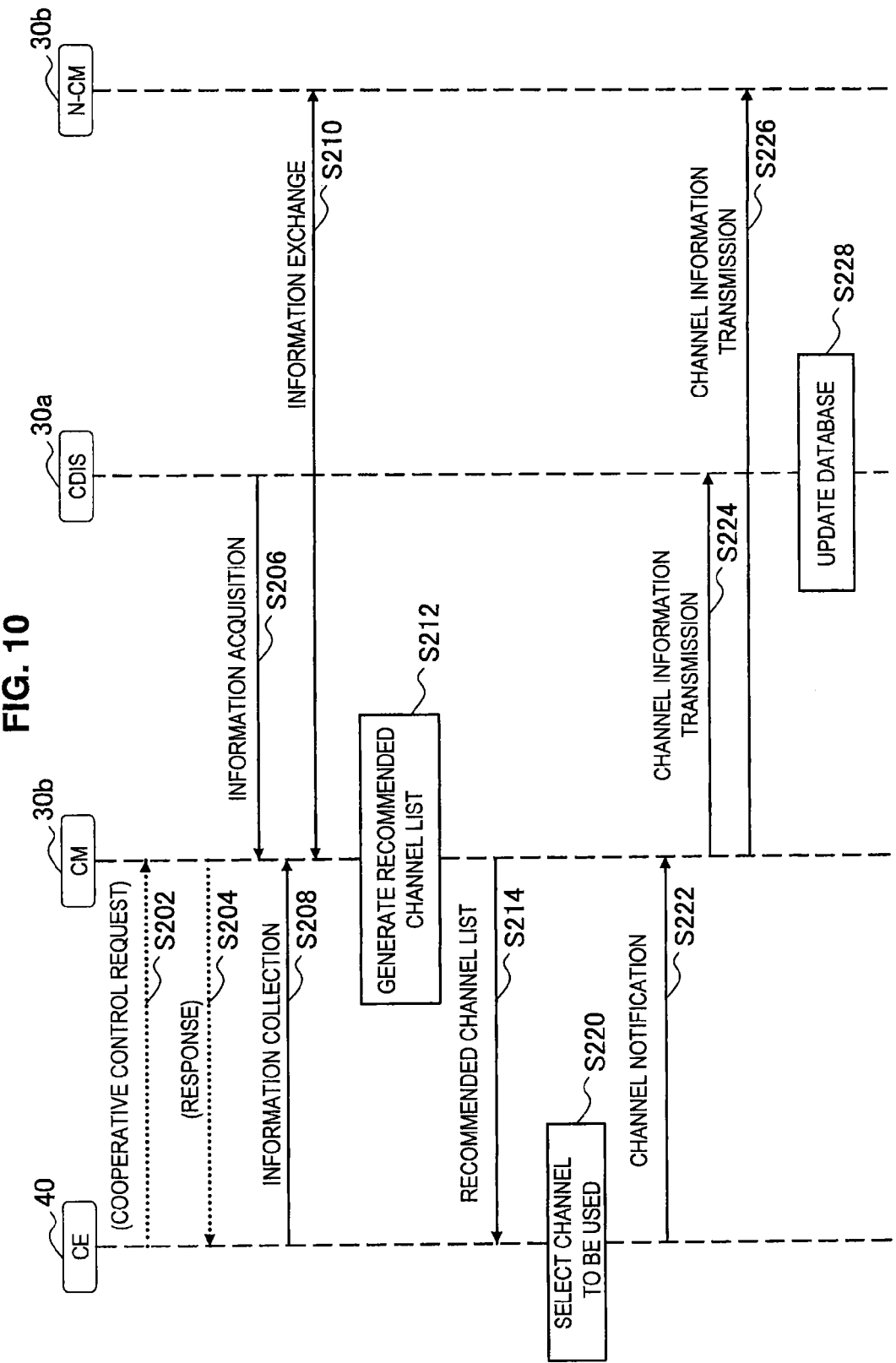
FIG. 10 is a sequence diagram showing an example of the flow of communication control processing in the second control model.

FIG. 10 is a sequence diagram showing an example of the flow of communication control processing in the second control model. Referring to FIG. 10, a cooperative control request is first transmitted from CE to CM (step S202) and a response is transmitted from CM to CE (step S204). The communication control processing in the second control model may be performed by being triggered by such a request or in accordance with detection of any other event.

After deciding to exercise cooperative control with CE, CM acquires information about the primary system and information about available channels from CDIS (step S206). CM also collects information about secondary systems from CE of the secondary usage nodes 40 belonging to the local apparatus (step S208). CM exchanges information used for deciding recommended channels with the neighbor-CM (step S210).

Next, CM generates a list of recommended channels listing channels, among available channels, recommended for the secondary usage node 40 (step S212). Then, CM transmits the generated list of recommended channels to the secondary usage node 40 (step S214).

Next, the secondary usage node 40 selects the channel to be used for the operation of a secondary system from channels contained in the list of recommended channels received from CM (step S220). Then, the secondary usage node 40 notifies CM of the selected channel via CE (step S222).

Next, CM transmits information about the channel selected by the secondary usage node 40 to CDIS (step S224). CM also transmits information about the channel selected by the secondary usage node 40 to the neighbor-CM (step S226). When the information about the selected channel is received, CDIS updates the database (step S228).

After the channel notification from the secondary usage node 40 to CM in step S222, CM may check whether selections are not competing, that is, an overlapping channel is selected by a plurality of the secondary usage nodes 40. If the channel selections by the plurality of the secondary usage nodes 40 are competing, for example, CM may transmit an updated list of recommended channels to the secondary usage nodes 40 other than the secondary usage node 40 that has transmitted the channel notification as the first node to allow the secondary usage nodes 40 to re-select the channel to be used. If channel selections are not competing, a notification indicating the confirmation of the selection of the channel to be used may be transmitted from CM to the secondary usage node 40 so that ACK is returned from each of the secondary usage nodes 40.

In the second control model, a part of the authority of CM is transferred to secondary usage nodes and CM and secondary usage nodes cooperate to decide channels for the operation of secondary systems. Performance demanded from CM is thereby reduced and therefore, depending on the arrangement of functional entities, the second control model is preferable to the first control model. Moreover, decisions are made without concentrating a large amount of information on CM and therefore, the load of signaling in a network is mitigated.

[4. Third Control Model]

The third control model is a control model in which CM arranged on each secondary usage node in a distributed manner individually makes a decision. The third control model is suitable for the arrangement of functional entities as illustrated in, for example, FIG. 6.

[4-1. Apparatus Configuration]

Figure 11:
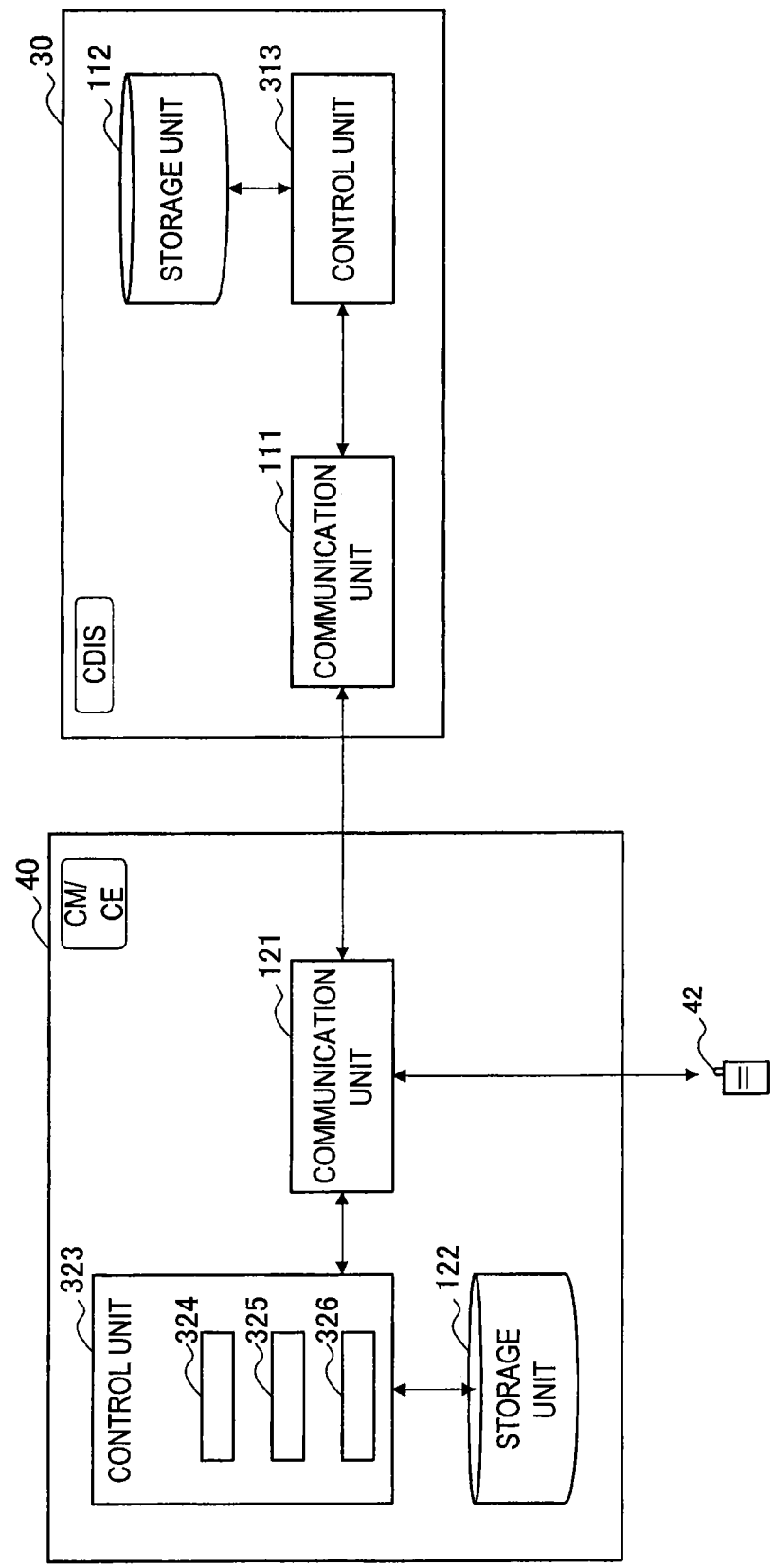
FIG. 11 is a block diagram showing an example of the configuration of apparatuses in a third control model.

FIG. 11 is a block diagram showing an example of the configuration of apparatuses in the third control model. Referring to FIG. 11, the communication control apparatus 30 having CDIS and the secondary usage node 40 having CM and CE are shown.

(1) CDIS

The communication control apparatus 30 includes the communication unit 111, the storage unit 112, and a control unit 313.

The control unit 313 controls the function of the communication control apparatus 30 as CDIS using a processor such as a CPU. For example, the control unit 313 collects information about secondary systems from each of the secondary usage nodes 40 via CE and CM. The control unit 313 also collects information about the primary system and information about available channels from the data server 20. The control unit 313 also supports neighbor discovery of neighbor-CM positioned near some CM. Also in the third control model, the control unit 313 does not select the master CM.

(2) CM/CE

The secondary usage node 40 includes the communication unit 121, the storage unit 122, and a control unit 323.

The control unit 323 controls the function of the secondary usage node 40 as CM and CE and also controls the operation of a secondary system by the secondary usage node 40 using a processor such as a CPU. More specifically, in the third control model, the control unit 323 includes an information acquisition unit 324, a selection unit 325, and a secondary system controller 326.

The information acquisition unit 324 acquires information about the primary system and information about channels, among frequency channels assigned to the primary system, available for secondary systems from the communication control apparatus 30 having CDIS.

The selection unit 325 selects the channel used for the operation of a secondary system from among available channels based on information acquired by the information acquisition unit 324. The control unit 325 may select the channel in consideration of a result of sensing by the local apparatus or the secondary usage node 42. If, for example, a channel not used by other secondary systems is present, the selection unit 325 may select the channel. The selection unit 325 may also select the channel in such a way that interference with the primary system or a nearby secondary system caused by the secondary system to be operated does not exceed a permissible level. If a normal channel and a restricted channel are unused, the selection unit 325 may select the normal channel preferentially. However, criteria for selecting a channel are not limited to the examples described here and other criteria may also be used.

When a channel is selected by the selection unit 325, the secondary system controller 326 starts the operation of a secondary system or reconfigures a secondary system on the selected channel. The secondary system controller 326 also notifies CDIS of the selection result of a channel.

[4-2. Processing Flow]

Figure 12:
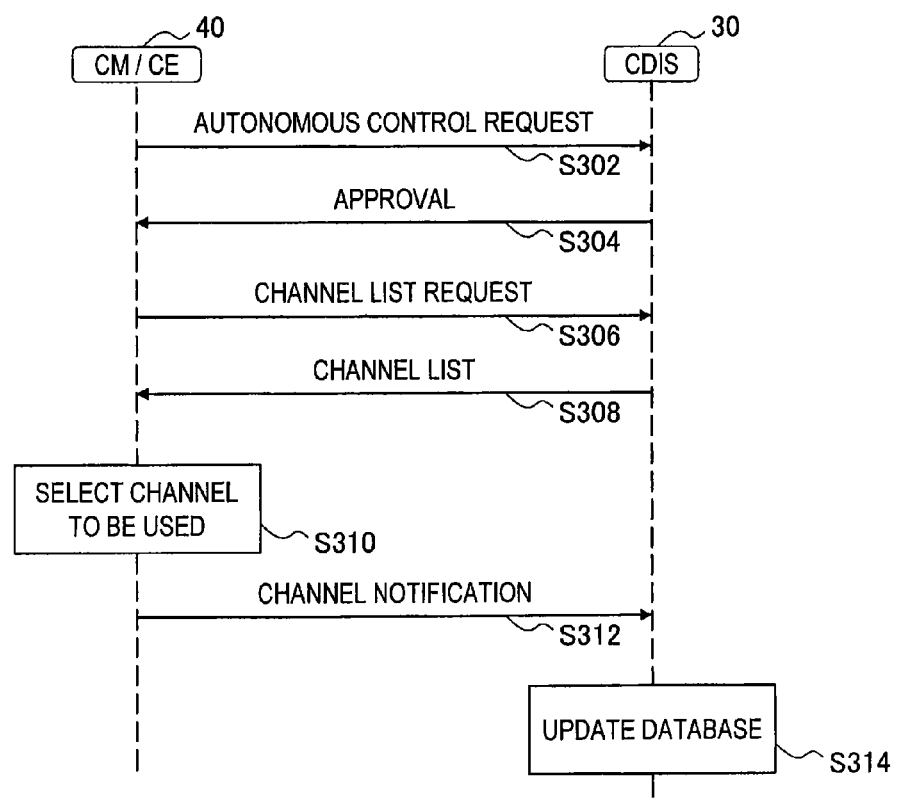
FIG. 12 is a sequence diagram showing an example of the flow of communication control processing in the third control model.

FIG. 12 is a sequence diagram showing an example of the flow of communication control processing in the third control model. Referring to FIG. 12, an autonomous control request is first transmitted from CM of the secondary usage node 40 to CDIS (step S302). Next, if the autonomous control request is approved by CDIS (step S304), CM requests CDIS to provide a channel list (step S306). Then, CDIS provides a channel list that lists available channels to CM (step S308).

Next, CM selects the channel to be used for the operation of a secondary system from among channels contained in the channel list provided from CDIS (step S310). Then, CM notifies CDIS of the selected channel (step S312). When the channel selected by CM is notified, CDIS updates the database (step S314).

In the third control model, the channel for the operation of a secondary system is autonomously selected by CM arranged on each secondary usage node in a distributed manner. Also in this case, performance demanded from each CM can be reduced. Moreover, decisions are made without concentrating information about a plurality of secondary systems on one CM and therefore, the load of signaling in a network is mitigated.

[5. Composite Control Model]

The above three control models may compositely be used depending on system requirements. In addition, the three control models may also be selected adaptively.

For example, some CMs in a system may desire cooperative control according to the second control model or autonomous control according to the third control model rather than central control according to the first control model. In such a case, a part of the system may be operated according to the second or third control model and the remaining part may be operated according the first control model.

In addition, for example, due to an increase in the number of nodes participating in a system during operation of the system according to the first control model, the load of the master CM may exceed the processing capacity of the master CM. In addition, the load of a secondary usage node may exceed the processing capacity of the node while a system is operated according to the third control model. In such cases, it is useful to distribute the load by shifting the control model in operation to another control model.

Figure 13:
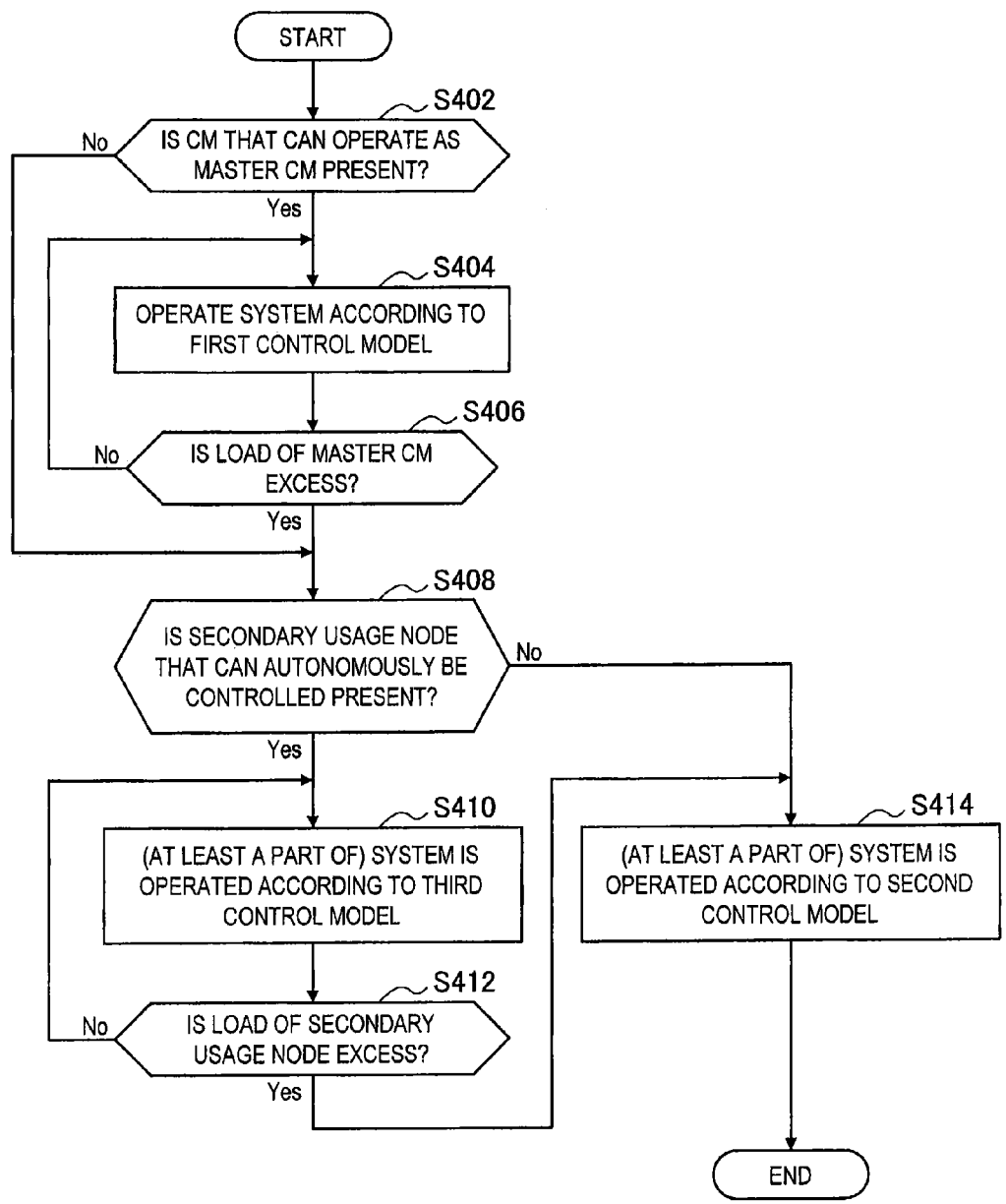
FIG. 13 is a flow chart showing an example of the flow an adaptive selection of a control model.

FIG. 13 is a flow chart showing an example of the flow an adaptive selection of the control model. The processing shown in FIG. 13 can be realized as processing performed CDIS, CM (for example, the master CM), or other independent functional entities.

Referring to FIG. 13, whether any CM that can operate as the master CM is present is first determined (step S402). If, for example, no CM having capabilities as the master CM is present in the system, all CMs reject to operate as the master CM, or none of CM is positioned inside a packet-based network, CM capable of operating as the master CM is determined not to be present. If CM capable of operating as the master CM is not present, the processing proceeds to step S408. On the other hand, if CM capable of operating as the master CM is present, the processing proceeds to step S404.

In step S404, the system is operated according to the first control model (step S404). Then, the load of the master CM (and/or the load of signaling of a network) is monitored during operation of the system (step S406). If, in step S406, the monitored load is detected exceeding the processing capacity of the master CM (or the network capacity or limits of QoS), the processing proceeds to step S408.

In step S408, whether a secondary usage node that can autonomously be controlled is present in the system is determined (step S408). The determination here may be made based on, for example, capabilities, performance, or QoS requirements of each secondary usage node. Then, if the presence of a secondary usage node that can autonomously be controlled is determined, the processing proceeds to step S410. On the other hand, if the non-presence of a secondary usage node that can autonomously be controlled is determined, the processing proceeds to step S414.

In step S410, at least a part of the system (for example, at least one secondary usage node that can autonomously be controlled and a group of nodes belonging to the secondary usage node) is operated according to the third control model (step S410). Then, the load of the secondary usage node operated according to the third control model is monitored (step S412). In step S412, if the monitored load is detected exceeding the processing capacity of the secondary usage node, the processing proceeds to step S414.

In step S414, at least a part of the system is operated according to the second control model (step S414). In the second control model, CM and the secondary usage node are cooperatively controlled and therefore, the load on each node can be distributed.

Then, the control model applied to the system may further be changed in accordance with various factors such as changes in the number of nodes participating in the system, changes in topology, and an increase or decrease in traffic. The change of the control model signaled from CDIS, CM (for example, the master CM), or another independent functional entity to nodes in the system.

<6. Summary>

Heretofore, the three control models to efficiently control coexistence of secondary systems have been described in detail. According to the first control model, channels used by a plurality of secondary systems are centrally decided by one master CM. Therefore, decisions by a plurality of CMs may compete. According to the second control model, the channel used by a secondary system is cooperatively decided between CM and a secondary usage node. That is, a part of the authority of CM can be transferred to the secondary usage node. Performance demanded from CM can thereby be reduced. Moreover, there is no need to concentrate a large amount of information on one CM and therefore, the load of signaling in a network can be mitigated. According to the third control model, the channel used by a secondary system is autonomously decided by each CM arranged in a distributed manner. Also in this case, performance demanded from CM can be reduced and the load of signaling in a network can be mitigated.

Also, according to the second control model, a list of channels recommended for the secondary usage node is generated by CM and provided to the secondary usage nodes. Then, the channel for the operation of a secondary system is selected from the list by the secondary usage node. CDIS and neighbor-CM are notified by CM of the channel selected by the secondary usage node. Therefore, a part of the authority of CM can be transferred to the secondary usage node while allowing a plurality of CMs to cooperate within the framework of the functional entities of CDIS, CM, and CE.

A sequence of control processing by each apparatus described herein may be realized by using any of software, hardware, and a combination of software and hardware. A program constituting software is stored in, for example, a storage medium provided inside or outside each apparatus. Then, each program is read into RAM (Random Access Memory) during execution and executed by a processor such as a CPU.

The preferred embodiments of the present disclosure have been described in detail above with reference to the accompanying drawings, whilst the technical scope of the present disclosure is not limited to the above examples, of course. A person skilled in the art may find various alterations and modifications within the scope of the appended claims, and it should be understood that they will naturally come under the technical scope of the present disclosure.

Reference Signs List 10, 12 Primary usage node
20 Data server
30 Communication control apparatus
40, 42 Secondary usage node
124 Information acquisition unit
125 Decision unit
126 Notification unit
224 Information acquisition unit
225 Generation unit
226 Notification unit
324 Information acquisition unit
325 Selection unit
326 Secondary usage controller

The invention claimed is:

1. A communication control apparatus comprising:
   circuitry configured to:
   acquire information about channels, among frequency channels assigned to a primary system, available to a secondary system of a plurality of secondary systems;
   generate a list of channels, among the channels available, recommended for a secondary usage node operating the secondary system; and
   notify the secondary usage node of the list generated by the circuitry to allow the secondary usage node to select a channel for secondary usage,
   wherein the circuitry decides the channels recommended to each secondary usage node within a set of secondary usage nodes to limit interference between said plurality of secondary systems operated by each of the secondary usage nodes to a predetermined level.

2. The communication control apparatus according to claim 1,
   wherein the circuitry acquires the information about the channels available from a server that stores information about one or more secondary systems, and
   wherein the circuitry notifies the server of the channel selected by the secondary usage node.

3. The communication control apparatus according to claim 1, wherein the circuitry further notifies another communication control apparatus of the channel selected by the secondary usage node.

4. The communication control apparatus according to claim 1, wherein the circuitry generates the list in accordance with a request from the secondary usage node.

5. The communication control apparatus according to claim 1, wherein the circuitry decides the channels recommended to the secondary usage node in a way that interference with the primary system caused by the secondary system does not exceed a permissible level.

6. The communication control apparatus according to claim 1, wherein when a central channel selection by a master control apparatus or an autonomous channel selection by the secondary usage node is not adopted, the communication control apparatus generates the list and notifies the secondary usage node of the list.

7. A communication control method to control secondary usage of frequency channels, comprising:
acquiring, by circuitry, information about channels, among frequency channels assigned to a primary system, available to a secondary system of a plurality of secondary systems;
generating, by the circuitry, a list of channels, among the channels available, recommended for a secondary usage node operating the secondary system; and
notifying, by the circuitry, the secondary usage node of the list generated to allow the secondary usage node to select a channel for secondary usage,
wherein the circuitry decides the channels recommended to each secondary usage node within a set of secondary usage nodes to limit interference between said plurality of secondary systems operated by each of the secondary usage nodes to a predetermined level.

8. A non-transitory computer-readable medium encoded with computer-readable instructions that, when executed by a communication control apparatus controlling secondary usage of frequency channels, causes the communication control apparatus to perform a method comprising:
acquiring information about channels, among frequency channels assigned to a primary system, available to a secondary system of a plurality of secondary systems;
generating, by a generation unit, a list of channels, among the channels available, recommended for a secondary usage node operating the secondary system; and
notifying the secondary usage node of the list generated by the generation unit to allow the secondary usage node to select a channel for the secondary usage,
wherein the channels recommended to each secondary usage node within a set of secondary usage nodes are determined to limit interference between said plurality of secondary systems operated by each of the secondary usage nodes to a predetermined level.

9. A communication system, comprising:
a communication control apparatus including circuitry configured to:
acquire information about channels, among frequency channels assigned to a primary system, available to a secondary system of a plurality of secondary systems,
generate a list of channels, among the channels available, recommended for a secondary usage node operating the secondary system, and
notify the secondary usage node of the list generated by the circuitry; and
a secondary usage node that selects a channel for the secondary usage based on the list notified from the communication control apparatus,
wherein the circuitry decides the channels recommended to each secondary usage node within a set of secondary usage nodes to limit interference between said plurality of secondary systems operated by each of the secondary usage nodes to a predetermined level.

10. The communication control apparatus according to claim 1, wherein the circuitry is further configured to operate in three control modes: a master control mode, a cooperative control mode and an autonomous control mode.

11. The communication control apparatus according to claim 10, wherein when operating in the master control mode, channels used by a plurality of secondary systems are centrally decided by the circuitry.

12. The communication control apparatus according to claim 10, wherein when operating in the first control mode, the circuitry decides channels used by secondary usage nodes under the control of the circuitry and further the circuitry decides channels used by secondary usage nodes under the control of a slave control apparatus.

13. The communication control apparatus according to claim 10, wherein when operating in the cooperative control mode, a channel used by a secondary system is cooperatively decided between the circuitry and the secondary node operating within the secondary system.

14. The communication control apparatus according to claim 10, wherein when operating in the autonomous control mode, a channel used by a secondary system is autonomously decided by each of a plurality of control apparatuses arranged in a distributed network.

\* \* \* \* \*